(12) United States Patent
Kim

(10) Patent No.: US 8,004,953 B2
(45) Date of Patent: Aug. 23, 2011

(54) OPTICAL PICK-UP AND DISC APPARATUS HAVING THE SAME

(75) Inventor: Bong Gi Kim, Suwon-si (KR)

(73) Assignee: SAMSUNG Electronics Co. Ltd., Suwon-si (KR)

( * ) Notice: Subject to any disclaimer, the term of this patent is extended or adjusted under 35 U.S.C. 154(b) by 499 days.

(21) Appl. No.: 11/950,775

(22) Filed: Dec. 5, 2007

(65) Prior Publication Data

US 2008/0198708 A1 Aug. 21, 2008

(30) Foreign Application Priority Data

Feb. 16, 2007 (KR) .................. 10-2007-0016858

(51) Int. Cl.
*G11B 7/00* (2006.01)

(52) U.S. Cl. ............ 369/112.02; 369/94; 369/120; 369/112.05

(58) Field of Classification Search .................. None
See application file for complete search history.

(56) References Cited

U.S. PATENT DOCUMENTS

| | | | |
|---|---|---|---|
| 5,572,500 A | 11/1996 | Ikeya et al. | |
| 7,358,471 B2 * | 4/2008 | Yamamoto | 250/201.5 |
| 7,623,428 B2 * | 11/2009 | Suh | 369/53.2 |
| 2002/0075783 A1 * | 6/2002 | Alon et al. | 369/112.02 |
| 2003/0133392 A1 * | 7/2003 | Iwasaki | 369/112.02 |
| 2006/0193236 A1 | 8/2006 | Watabe et al. | |

FOREIGN PATENT DOCUMENTS

| | | |
|---|---|---|
| JP | 8-185640 | 7/1996 |
| JP | 2004-79049 | 3/2004 |
| JP | 2007018603 | 1/2007 |
| KR | 2005-74839 | 7/2005 |

OTHER PUBLICATIONS

Search Report issued in European Patent Application No. 07123128.6 on Oct. 15, 2008.
Korean Office Action issued Feb. 28, 2011 in KR Application No. 10-2007-0016858.

* cited by examiner

*Primary Examiner* — Joseph Haley
(74) *Attorney, Agent, or Firm* — Stanzione & Kim, LLP

(57) ABSTRACT

An optical pick-up and a disc apparatus having the same. The inferiority of a tracking signal caused by an adjacent layer during the recording and/or reproducing of an optical disc with multiple recording layers is effectively prevented. The optical pickup includes a light source to emit light with a predetermined wavelength, a light collecting unit to collect the light emitted from the light source to form a light spot on a signal recording layer of an optical disc having a plurality of recording layers, a photodetector to receive the light reflected by the optical disc to detect a signal, and an optical member to change the optical transmission of the light reflected by the optical disc according to an incident angle of the reflected light to decrease an optical transmission of a noise light entering the photodetector.

22 Claims, 7 Drawing Sheets

OPTICAL PICK-UP AND DISC APPARATUS HAVING THE SAME

CROSS-REFERENCE TO RELATED APPLICATION

This application claims the benefit of Korean Patent Application No. 2007-16858, filed in the Korean Intellectual Property Office on Feb. 16, 2007, the disclosure of which is incorporated herein by reference.

BACKGROUND OF THE INVENTION

1. Field of the Invention

Aspects of the present invention relate to an optical pick-up and a disc apparatus having the same, and more particularly, to an optical pick-up in which inferiority of a tracking signal caused by an adjacent layer during the recording and/or reproducing of an optical disc with multiple recording layers is effectively prevented, and a disc apparatus having the same.

2. Description of the Related Art

Optical discs are being developed and commercialized to record and store high definition image information and high quality audio information for a long period of time. The optical disc is a recording medium in which a very great deal of pits is formed in the surface so as to change reflection of a laser beam to record and/or reproduce information such as voice, images, documents, and the like. Conventional optical discs, such as compact discs (CD), digital versatile discs (DVD), and the like, are chiefly used. Recently, as the conventional disc is reaching a limit in recording capacity, new optical discs, such as a recordable/rewritable blue-ray disc (Blu-ray disc, or BD), an advanced optical disc (AOD, also called HD-DVD), and the like, capable of recording a vast quantity of information (more than a few tens of gigabytes) are being developed and are starting to be widely used.

The capacity of the information recorded in the optical disc is in inverse proportion to a size of a light spot focused on the surface of the optical disc. The size of the light spot S is determined by a wavelength $\lambda$ of a laser beam to be used and a numerical aperture NA of an objective lens in the form of the following formula 1.

$$S \propto k\lambda/NA \quad \text{Formula 1}$$

where k is a constant dependent on an optical system and has a value of usually 1 to 2.

Thus, in order to record more information in the optical disc, the size S of the light spot focused on the optical disc must be decreased. Moreover, in order to decrease the size S of the light spot, as expressed by the formula 1, either the wavelength $\lambda$ of the laser beam must be decreased or the numeric aperture NA must be increased.

In other words, as the capacity of the optical disc increases, a light source with shorter wavelength and an objective lens with higher numeric aperture must be used. For example, near infrared light with a wavelength of 780 nm and an objective lens with a numeric aperture 0.45 are used for compact discs, and red light with a wavelength of 650 nm (or 630 nm) and an objective lens with a numeric aperture of 0.6 (0.65 in a recordable type) are used for digital versatile discs. For Blu-ray optical disc, light with a short wavelength (405 nm to 408 nm), a blue light, and an objective lens with a numeric aperture of 0.85 are used.

Recently, as the quantity of information to be recorded in the high density optical disc (BD) increases, a multilayer optical disc having two or more layers formed in one side or both sides of the optical disc is being developed. In this multilayer optical disc, light returned to an optical detector during the recording and/or the reproducing is influenced by a layer (a layer to be recorded and/or reproduced) positioned at a focal point of the objective lens as well as by adjacent layers. Since a gap between the recording layers defined in the standard is determined within a bound where the information in the optical disc does not influence an interlayer cross-talk, the interlayer cross-talk should not influence a servo-signal.

FIG. 1 shows a light path for the reproduction of the multilayer optical disc in which a focal point of light L10, reflected by a layer L0 (a layer adjacent to a layer to be reproduced, hereinafter referred to as "adjacent layer"), is positioned in front of that of light L11 received by an optical detector 1 during the reproduction of a layer L1 (layer to be reproduced, hereinafter referred to as "reproducing layer") near to a light incident surface. A focal point of light L01 reflected by the adjacent layer L1 is positioned behind a focal point of light L00 received by the optical detector 1 during the reproduction of the layer L0 (adjacent layer) farther away from the light incident surface.

A differential push-pull (DPP) method is used in the dual layer optical disc to detect a tracking error signal. The light is split into three lights, 0th order light (main light) and ± first order lights (sub-light), using a grating and intensity ratio of the split light. The ratio—first order light: 0th order light:+ first order light is equal to or greater than 1:10:1. This is because it is advantageous to use the 0th order light beam by increasing the intensity of the 0th light beam in view of a use effect.

When, in the multilayer optical disc, the DPP method is used to detect the tracking error signal, the 0th order light reflected by the adjacent layer is overlapped to the ±1 order lights reflected by the reproducing layer, so that the tracking signal deteriorates. Since the difference of light intensity between the 0th order light reflected by the reproducing layer and the 0th order light reflected by the adjacent layer is very large, the 0th order light of the adjacent layer does not influence the reproduction signal. However, since the light intensity difference between the ±1 order light reflected by the reproducing layer and the 0th order light (main light) reflected by the adjacent layer is not relatively large, the 0th order light of the adjacent layer has considerable effects on a differential signal (sub-tracking signal) used to detect the tracking signal using the DPP method.

In order to solve the above problem, Korean Patent Unexamined Application Publication No. 2005-0074839 proposes an optical pick-up in which 0th order light (main light) reflected by the adjacent layer is restricted to improve the deterioration of the tracking signal due to the adjacent layer. The disclosed optical pick-up uses a polarized hologram to diffract the 0th order light reflected by the adjacent layer to regions other than a detector region so as to prevent 0th order light reflected by the adjacent layer from entering a sub-photodetector.

However, the polarized hologram blocks the 0th order light reflected by the adjacent layer from entering the sub-photodetector as well as 0th order light (signal light) reflected by the focused reproducing layer (signal layer) and entering a main photodetector. When the 0th order light (signal light) reflected by the reproducing layer enters the main photodetector to detect a radio frequency (RF) signal, since about 10% of the light is blocked by the polarized hologram, the magnitude of a signal to be detected is decreased and signal characteristics, such as the jitter characteristic, deteriorate. Particularly, since the profile of the incident light into the photodetector is a Guassian type, and the architecture of the polarized hologram blocks a central area of the Guassian profile, that is, a part where the intensity of a signal is the highest, the RF signal characteristic is significantly deteriorated.

If the area of the polarized hologram is decreased in order to mitigate the deterioration of this RF signal characteristic, it is difficult to achieve the original purpose of restricting the 0th order light (noise light) reflected by the adjacent layer from entering the sub-photodetector. Furthermore, since the blocking area of the polarized hologram must be increased when light receiving magnification is small, the magnitude of the RF signal is more decreased and the RF signal more deteriorates.

This problem is disclosed in the above patent publication. To solve the problem, sub-photodetectors are added to separately detect lights diffracted to areas separated from that of the photodetector and to compensate the deterioration of the signal characteristic. However, since the optical signals used for the compensation, diffracted to the separated areas and separated from each other, contain signal coherent noise initially, it is not sufficient to help the proper compensation of the RF signal.

Thus, as a practical improvement for the deterioration of the RF signal characteristic, another solution would be to minutely adjust the polarized hologram so as to find a point where the influence by the adjacent layers is minimized and an original signal from the reproducing layer is maximized. However, this improvement causes the number of components for the minute adjustment to increase and increases manufacturing costs and manufacturing time.

SUMMARY OF THE INVENTION

Aspects of the invention provide an optical pick-up in which deterioration of a tracking error signal due to an adjacent layer can be effectively prevented by increasing a size of light reflected by the adjacent layer during the recording and/or the reproducing of a multilayer optical disc, and a disc apparatus having the same.

Another aspect of the invention is to provide an optical pick-up in which an optical member having variable optical transmission is installed between an objective lens and a collimating lens to relatively reduce the intensity of noise light reflected by an adjacent layer in comparison to the intensity of a signal light so that an interlayer signal coherent effect of a multilayer optical disc is effectively removed and deterioration of an RF signal characteristic is more effectively improved, and a disc apparatus having the same.

According to an aspect of the present invention, an optical pick-up is provided. The optical pick-up comprises a light source to emit light with a predetermined wavelength; a light collecting unit to collect the light emitted from the light source to form a light spot on a signal recording layer of an optical disc having a plurality of recording layers; a photodetector to receive the light reflected by the optical disc to detect a signal; and an optical member to change the optical transmission of the light reflected by the optical disc according to an incident angle of the reflected light so as to decrease a transmittance of the optical member with respect to a noise light entering the photodetector.

According to another aspect of the present invention, the light source comprises an optical outputting unit to emit a light with a blue ray wavelength satisfying the Blu-ray optical disc standard, and the light collecting unit comprises an objective lens having a numeric aperture of about 0.85 satisfying the Blu-ray optical disc standard.

According to another aspect of the present invention, the optical pick-up further comprises an optical path converter to guide the light emitted from the light source so as to direct the light collecting unit and to guide the light reflected by the optical disc to direct the photodetector; and the optical member is positioned between the optical path converter and the light collecting unit.

According to another aspect of the present invention, the optical path converter comprises a collimating lens to collimate the light emitted from the light source, and the optical member is positioned between the collimating lens and the light collecting unit.

According to another aspect of the present invention, the optical member comprises a liquid crystalline layer to transmit a light reflected by the optical disc and entering the liquid crystalline layer perpendicularly and to absorb an incident light to be converged or diverged to change the optical transmission of the light according to an incident angle of the light.

According to another aspect of the present invention, the liquid crystalline layer is made of liquid crystalline polymers and has a thickness of 0.2 micro-meters to 100 micro-meters.

According to another aspect of the present invention, the intensity of the noise light comprises the intensity of light reflected by an adjacent layer other than the signal recording layer.

According to another aspect of the present invention, the optical pick-up further comprises a grating to divide the light emitted from the light source into a 0th order light and ± first order lights to be projected on the optical disc, the photodetector comprises a main photodetector to receive the 0th order light reflected by the optical disc and first and second sub-photodetectors to respectively receive the ± first order lights reflected by the optical disc, and the optical member decreases the intensity of the 0th order light reflected by the adjacent layers so as to decrease the intensities of reflected lights entering the first and second sub-photodetectors.

According to another aspect of the present invention, the optical member decreases the intensity of the 0th order light reflected by the adjacent layers such that the intensities of the 0th order light reflected by the adjacent layers are less than that of the signal light of the signal recording layer.

According to another aspect of the present invention, the signal recording layer comprises a layer to be recorded and/or reproduced.

According to another aspect of the present invention, a disc apparatus is provided. The disc apparatus comprises an optical pick-up to record and/or reproduce information on and/or from an optical disc having a plurality of recording layers; a driving unit to drive the optical pick-up; and a controller to control a focus servo and a tracking servo of the optical pick-up; wherein the optical pick-up comprises an optical member to decrease the intensity of a light reflected by an adjacent layer other than a signal recording layer of the recording layers of the optical disc, by changing the optical transmittance of the optical medium with respect to the light reflected by the optical disc according to an incident angle of the reflected light.

According to another aspect of the present invention, the optical disc comprises a multilayer optical disc including at least one side having a plurality of signal recording layers satisfying the Blu-ray optical disc standard.

The optical member decreases the optical transmission of the light reflected by the adjacent layer such that the intensity of the light reflected by the adjacent layer is weaker than the intensity of a signal light of the signal recording layers.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
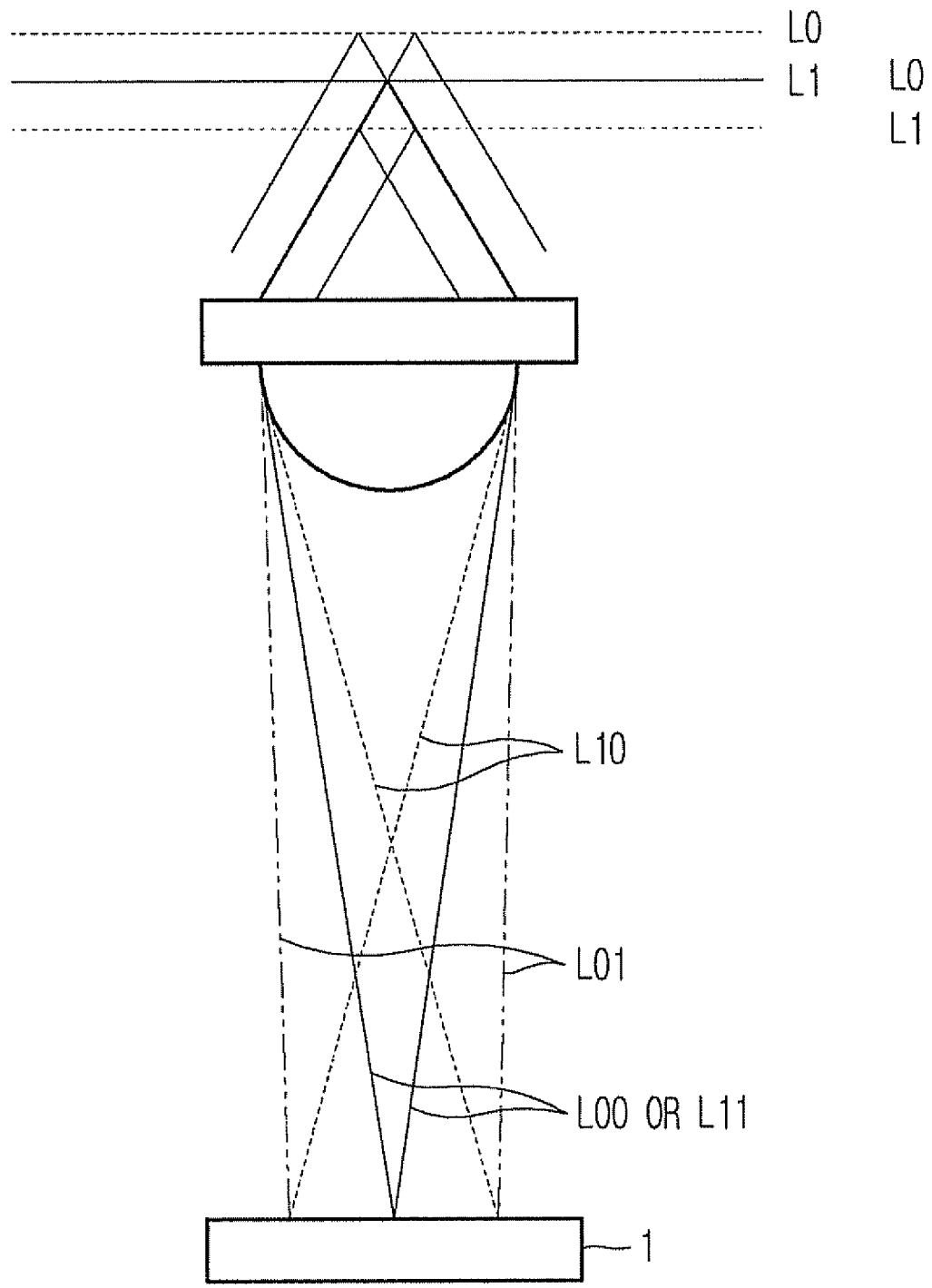
FIG. 1 is a schematic view illustrating a light path when a multilayer optical disc is reproduced.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
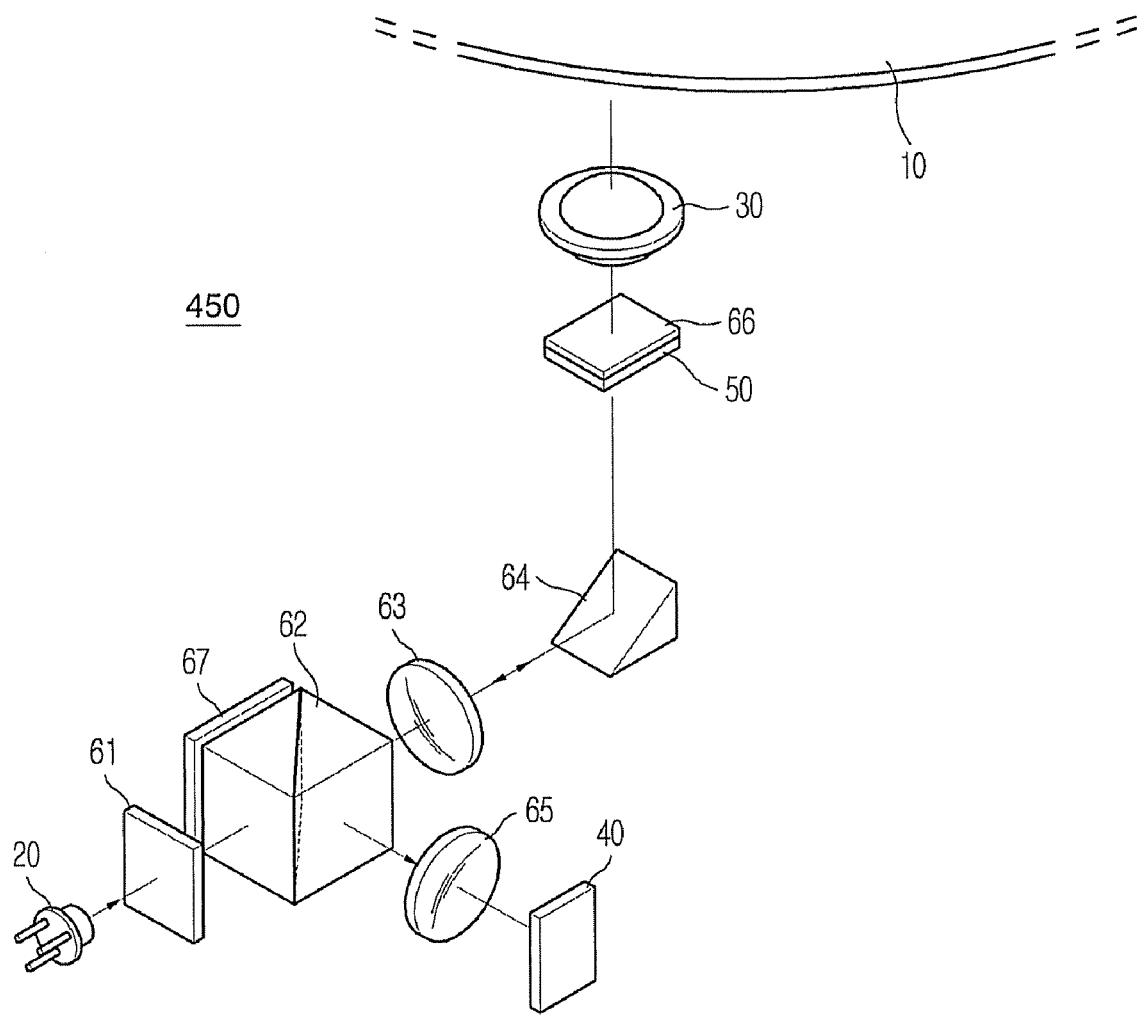
FIG. 2 is a perspective view schematically illustrating an optical system of an optical pick-up according to an embodiment of the present invention.
Figure 3:
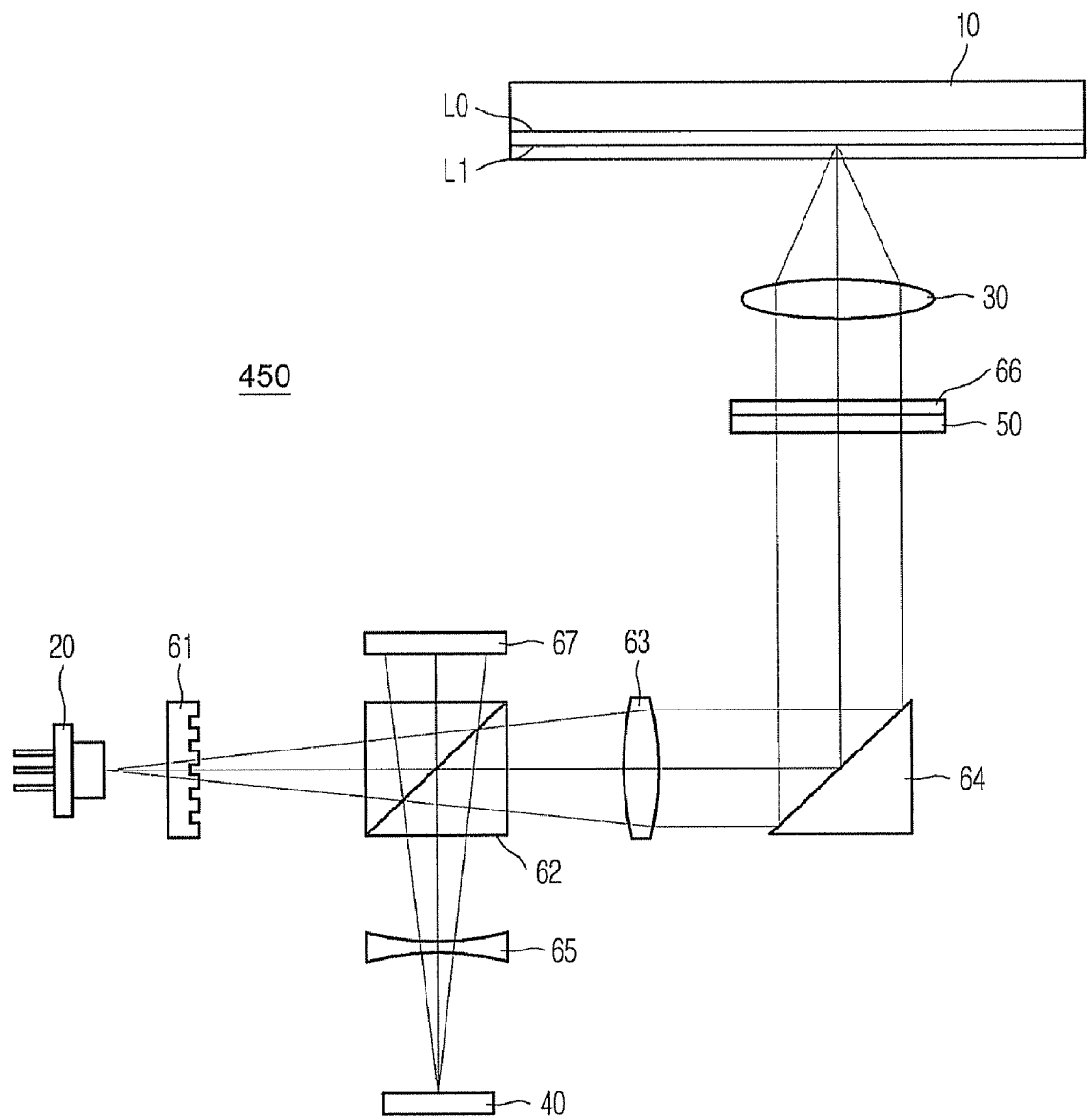
FIG. 3 is a plan view illustrating an arrangement of the optical pick-up in FIG. 2.

FIG. 2 shows an optical system of an optical pick-up 450 according to an embodiment of the present invention. FIG. 3 is a plan view illustrating an arrangement of the optical pick-up in FIG. 2. The optical pick-up has an optical architecture using different wavelengths of light to be applied to various types of optical discs with different recording densities and a light path converter. Thus, the optical pick-up may be used to reproduce data from a variety of optical discs, such as CDs, DVDs, Blu-ray discs, and HD-DVDs. The optical architecture can be configured in various types. The optical pick-up projects the laser beam on a signal recording layer of the optical disc to record information and receives the laser beam reflected by the signal recording layer of the optical disc to reproduce the information recorded in the optical disc in noncontact manner.

As illustrated in FIGS. 2 and 3, the optical pick-up 450 includes a light source 20, and objective lens 30, a photodetector 40, an optical member 50, and an optical path converter 60. According to other aspects of the invention, the optical pick-up 450 may include additional components. Similarly, the functionality of two or more of the above components may be combined into a single unit.

The light source 20 emits a laser beam with a wavelength corresponding to a format of an optical disc 10. The objective lens 30 focuses the light emitted from the light source 20 to form light spots on signal recording layers L0 and L1 of the optical disc 10. The photodetector 40 detects an information signal and/or an error signal by receiving light focused upon the optical disc by the objective lens 30 and reflected by the optical disc 10 back to the photodetector 40. The optical member 50 changes the optical transmission of light reflected by the optical disc 10 to reduce the intensity of noise light received by the photodetector 40. The optical path converter 60 changes a traveling path of a light beam.

The optical disc 10 may be a BD standard optical disc having multiple recordable signal recording layers L0 and L1, among various types of an optical disc using light beams with different wavelengths and having different recording densities, and includes a cover to protect dual recording layers L0 and L1 and recording signals named by "pit" formed in the recording layers L0 and L1.

The thickness of the cover glass of the single-layer BD optical disc 10 is generally 0.1 mm, and the recording layers are usually within a distance of 0.1 mm from the surface of the cover glass. In a BD dual layer optical disc, there are two signal recording layers, a layer L1 0.075 mm from the surface of the cover glass and a layer L0 0.1 mm from the surface of the cover glass.

The light source 20 emits a light beam of a desired wavelength, such as a blue ray having a wavelength of 405 nm satisfying the advanced optical disc (AOD, also called HD DVD) standard and/or the BD standard. The objective lens 30 may have a numeric aperture NA satisfying the BD standard, i.e., a numeric aperture of about 0.85.

If the light source 20 emits a light beam with a wavelength in the blue ray region and the objective lens 30 has the numeric aperture of 0.85, then the optical pick-up 450 can record and/or reproduce the high density optical disc 10 having a plurality of recording layers L0 and L1 formed in a single side, particularly, the optical disc 10.

The photodetector 40 is a photodiode to detect information signal and/or an error signal by receiving the light beam reflected by and returned from the optical disc 10, and will be described in detail with reference to FIG. 4.

The optical member 50 is made of a liquid crystal panel having optical transmission varied according to an incident angle of the light such that the optical transmission of the signal light (0th order light) reflected by the layer (a signal recording layer as an object to be recorded and/or reproduced) positioned at the focal point of the objective lens 30 is never influenced, but the intensity of the noise light (0th order light) reflected by the adjacent layers (layers adjacent to the recording and/or reproducing layer) is reduced. The optical member 50 will be described in detail with reference to FIG. 5.

The optical path converter 60 guides the light emitted from the light source 20 to direct the objective lens 30 and the light reflected by the optical disc 10 to direct the photodetector 40. The optical path converter 60 includes a grating 61, a beam splitter 62, a collimating lens 63, a reflective mirror 64, an astigmatism lens 65, and a quarter wave plate 66. The grating 61 separates the light emitted from the light source 20 into three light beams. The beam splitter 62 changes the traveling path of the light according to the polarized direction of the light beam. The collimating lens 63 changes divergent light passing through the beam splitter 62 into a parallel light beam. The reflective mirror 64 bends the traveling path of the light. The astigmatism lens 65 detects a focus error signal using an astigmatism method. The quarter wave plate 66 rotates a polarized component of the light entering the objective lens 30 by 90 degrees. The optical path converter 60 further includes a feedback photodiode 67 to control an output of the light emitted from the light source 20.

The grating 61 is an optical divisional diffraction element to split the light emitted from the light source 20 into the 0th order (main light) and ± first order lights (sub-lights) such that the tracking error signal may be detected using the three beam method or the DPP method. The grating 61 obtains the reproduction signal from the 0th order detected signal reflected by the optical disc 10 and obtains the tracking error signal by operation of the 0th order light reflected by the optical disc 10 and the ± first order detected signals. The grating 61 may be integrally formed with a half wave plate to rotate the polarizing direction by 180 degrees.

Figure 4:
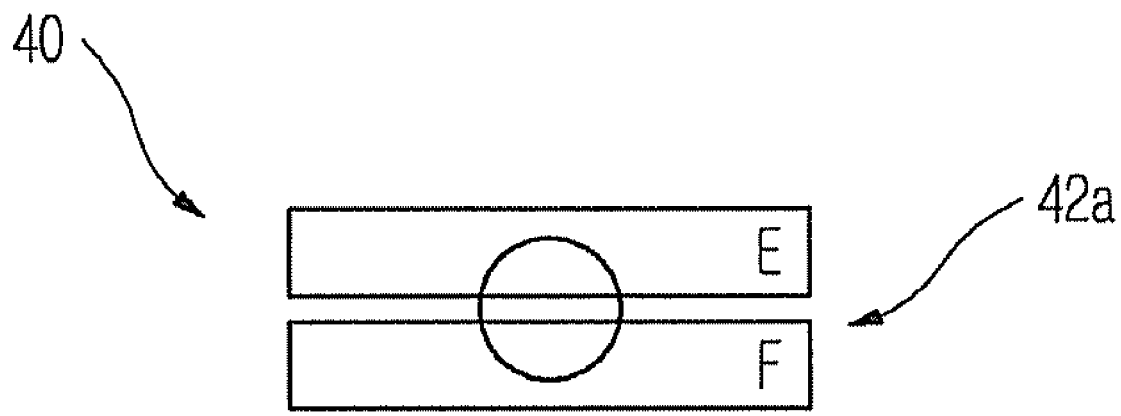
FIG. 4 is a schematic view illustrating an exemplary photodetector employed in the optical pick-up according to an embodiment of the present invention.
Figure 4:
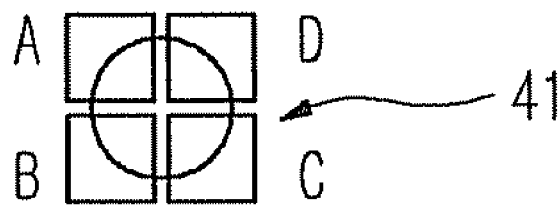
Figure 4:
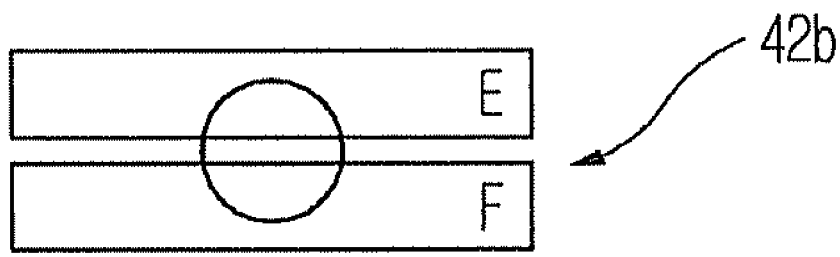

FIG. 4 shows the photodetector 40 employed in the optical pick-up 450. The photodetector 40 may detect the tracking error signal using the DPP method. If the light emitted from the light source 10 is divided into three lights, such as the 0th order light (main light) and the ± first order lights (sub-lights), then, as shown in FIG. 4, the photodetector 40 includes a main photodetector 41 to receive the 0th order light reflected by the optical disc 10 and first and second sub-photodetectors 42a and 42b provided at the sides of the main photodetector 41 to respectively receive the ± first order lights reflected by the optical disc 10.

The main photodetector 41 may be divided into two parts in a direction (R-direction) corresponding to the radial direction of the optical disc 10 and in a direction (T-direction) corresponding to the tangential direction of the optical disc 10, respectively, such that the focus error signal and the tracking error signal can be detected. The main photodetector 41 may be divided into two parts in the R-direction and into two parts in the T-direction, and has a quadruple structure.

The first and second sub-photodetectors 42a and 42b may be divided into two parts in the R-direction to detect the tracking error signal using the DPP method. If light receiving regions provided in the main photodetector 41 to receive the 0th order light are referred to as A, B, C, and D respectively, and light receiving regions provided in the first and second sub-photodetectors 42a and 42b to receive the ± first order lights are referred to as E, F, G, and H respectively, the tracking error signal detected by the DPP method becomes TEPDPP=[(A+D)−(B+C)]−k[(E−F)+(G−H)]. Here, k is a coefficient relating to the intensity ratio of the 0th order light and the ± first order lights and is 10/(1+1)=5 when the respective intensity ratios are 1:10:1.

The reason that the intensity ratios of the 0th order light and the ± first order lights are 1:10:1 is because the large intensity ratio of the 0th order light is advantageous in view of using efficiency of light due to the reason that the 0th order light can obtain the reproduction signal from the 0th order light signal containing information from the optical disc 10.

Figure 5:
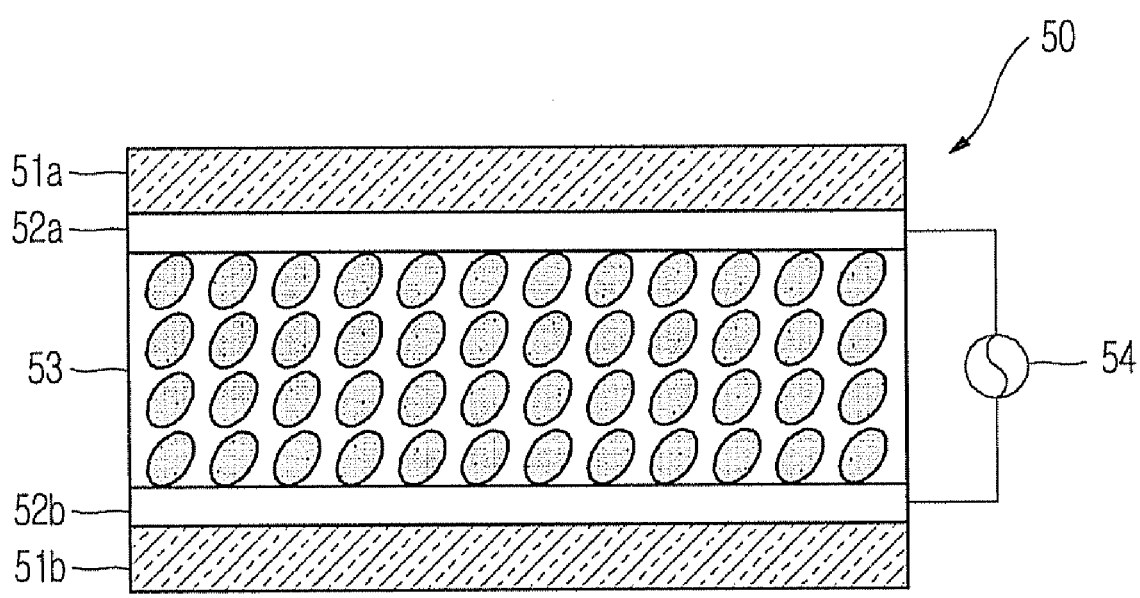
FIG. 5 is a view illustrating an optical member employed in the optical pick-up according to an embodiment of the present invention.

FIG. 5 shows the optical member 50 employed in the optical pick-up 450 according to an embodiment of the present invention. The optical member 50 includes a plurality of transparent substrates 51a and 51b, transparent electrodes 52a and 52b, a liquid crystalline layer 53, and a power supply 54.

The transparent substrates 51a and 51b are arranged so as to face each other. The transparent electrodes 52a and 52b are installed in the transparent substrates 51a and 51b, respectively, to receive voltages. The liquid crystalline layer 53 is formed between the transparent electrodes 52a and 52b to transmit light at different refractive indexes according to polarized direction of incident lights when the voltages are supplied. The power supply 54 supplies the voltages to the transparent electrodes 52a and 52b. The optical member 50 may have a thickness of 0.2 micro-meters to 100 micro-meters and may be horizontally installed like the quarter wave plate 66, though other arrangements and thicknesses are possible, such as a vertical arrangement.

The liquid crystalline layer 53 is made of liquid crystalline polymers to change the optical absorptivity of an incident light according to ON/OFF of the voltages applied to the transparent electrodes 52a and 52b to pass the lights at different diffractive indexes according to incident angles of the incident lights. When the voltages are applied to the liquid crystalline layer and the polymers are arranged in a single row in the direction where the voltages are applied, the incident light is less absorbed and the majority of the incident light is transmitted through the liquid crystalline layer 53.

When the voltages applied to the liquid crystalline layer are released (no longer applied), the polymers return to their initial positions and are arranged at a predetermined angle so that an area where the incident light is focused is widened, the absorption of the incident light increases, and the majority of the incident light cannot be transmitted. As a result, the optical member 50 transmits the majority (98% or more) of the signal light (0th order light) reflected by the layer (signal recording layer) where the focal point of the objective lens 30 is positioned, and transmits less than 10% of the noise light (0th order light) reflected by the adjacent layers.

Operations and effects of the optical pick-up 450 and a disc apparatus having the same will be described. The light emitted from the light source 20 is diffracted by the grating 61 and is divided into three light beams, such as the 0th order light (main light) and the ± first order lights (sub-lights), to detect the tracking error signal. The divided light beams pass through the collimating lens 63 via the beam splitter 62 to be converted into collimated beams, and are reflected by the reflective mirror 64 to direct the objective lens 30. The collimated beams pass through the quarter wave plate 66 positioned in front of the objective lens 30 and are converted into circular polarized beams. The circular polarized beams pass through the objective lens 30 to form light spots on the signal recording layers L0 and L1 of the optical disc 10.

After that, the light beams reflected by the signal recording layer L0 or L1 and the adjacent layer L1 or L0 of the optical disc 10 are received by the photodetector 40 via the beam splitter 61. The main photodetector 41 of the photodetector 40 receives the 0th order light (signal light) reflected by the signal recording layer L0 or L1, and the first and second sub-photodetectors 42a and 42b of the photodetector 40 receive the ± first order lights (sub-lights) reflected by the signal recording layers L0 and L1. The 0th order light (noise light) reflected by the adjacent layer L1 or L0 is expanded due to the defocus phenomenon to be received by the main photodetector 41 and the first and second photodetector 42a and 42b simultaneously.

For the dual layer optical disc 10 having two signal recording layers L0 and L1, the light returning to the photodetector 40 during the recording/reproduction of one of the layer L1 near to the light entering surface of the optical disc 10 and the layer L0 far from the light entering surface is influenced by a layer (the signal recording layer) where the focal point of the objective lens 30 is positioned as well as the adjacent layers thereof. For example, if the layer L1, near the light entering surface, is reproduced, the 0th order light reflected by the layer L0 to which the light is largely focused reaches the first and second sub-photodetectors 42a and 42b to influence the tracking error signal of the ± first order lights reflected by the layer L1. This is because, as described above, the intensity of the 0th order light is much higher than those of the ± first order lights.

Thus, in order to prevent the 0th order light reflected by the adjacent layers from influencing the tracking error signal, the optical member 50 may be installed between the objective lens 30 and the collimating lens 63 such that the signal light (0th order light) reflected by the layer (signal recording layer to be recorded and/or reproduced) positioned at the focal point of the objective lens 30 is never influenced, but the optical transmission of the noise light (0th order light) reflected by the adjacent layers is decreased to relatively reduce the intensity of noise to be received by the first and second sub-photodetectors 42a and 42b. For example, when the layer L1 is reproduced, the optical transmission of the 0th order light (noise light) reflected by the layer L0 is decreased to relatively reduce the reflected intensity of the reflected light of the noise light (0th order light reflected by the layer L0) arriving at the first and second sub-photodetectors 42a and 42b, so that the deterioration of the tracking error signal can be prevented.

FIG. 6 shows the optical transmission of the optical member 50 employed in the optical pick-up 450 according to an embodiment of the present invention. The optical member 50 having the liquid crystalline layer 53 is positioned between the objective lens 30 and the collimating lens 63 to change remarkably the optical transmission of the noise light (0th order light) reflected by the adjacent layers (adjacent to the recording and/or reproducing layers) without influencing the optical transmission of the signal light (0th order light) reflected by the signal recording layer (to be recorded and/or reproduced) positioned at the focal point of the objective lens 30.

Figure 6A:
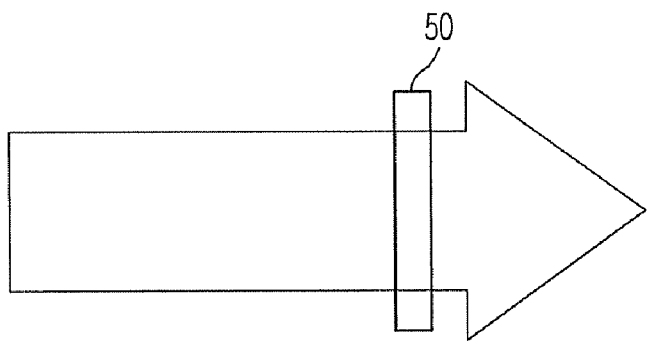
FIG. 6 is a view illustrating the optical transmission of the optical member employed in the optical pick-up according to an embodiment of the present invention.

The principle of the optical member 50 is as follows. Since the 0th order light (signal light) reflected by the signal recording layer of the optical disc 10 positioned at the focal point of the objective lens 30 travels parallel, the signal light enters the optical member 50 having the liquid crystalline layer 53 perpendicularly thereto at 0 degree and is less absorbed by the liquid crystalline layer 53. The optical member 50 having the crystalline layer 53, as illustrated in FIG. 6A, has the optical transmission of 98% or more of the signal light.

Figure 6B:
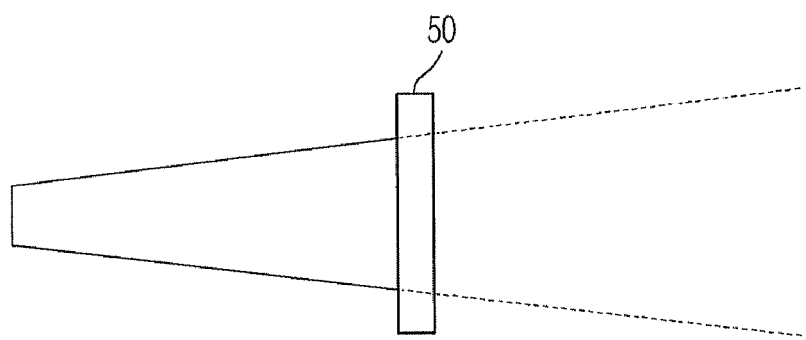
Figure 6C:
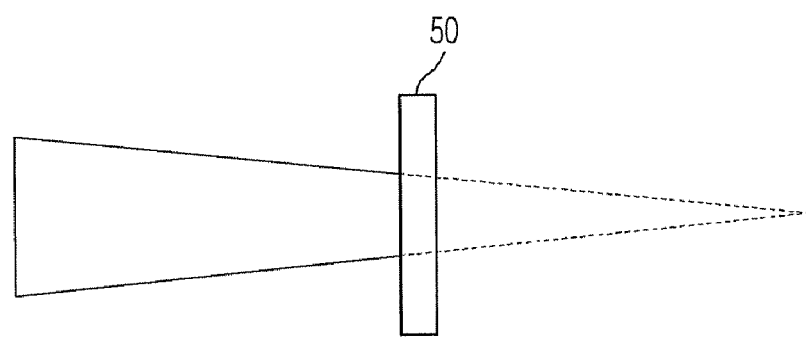

However, since the 0th order light reflected by the adjacent layer diverges or converges, the noise light enters the optical member 50 having the liquid crystalline layer 53 approximately at 0.1 degree and is significantly absorbed. As shown in FIGS. 6B and 6C, less than 10% of the noise light is transmitted through the optical member 50 having the liquid crystalline layer 53. In other words, the transmittance of the noise light is significantly reduced. As such, as the optical transmission of the noise light reflected by the adjacent layer decreases, the reflected intensities of the 0th order lights to be focused on the first and second sub-photodetectors 42a and 42b are weakened, and noise is reduced.

As a result, it is possible to solve the problem in the conventional art that a part of the signal lights (0th order lights), reflected by the signal recording layer (for example, the layer L1) and entering the main photodetector 41 of the photodetector 40, is completely intercepted. In addition, the optical transmissions of the noise lights (0th order lights), reflected by the adjacent layers and focused on the first and second sub-photodetectos 42a and 42b of the photodetector, are decreased, such that the optical transmissions of the noise lights to arrive at the first and second sub-photodetectors 42a and 42b decrease and the intensities decrease so as to definitely distinguish the noise light (0th order light) from the sub-lights (± first order lights) reflected by the signal recording layer (for example, the layer L1). The deterioration of the tracking error signal caused by the coherent noise light due to the adjacent layers is thus reduced.

Since the incident angles of the divergence and the convergence are used, the optical member 50 does not need to be adjusted, and it is possible to position the optical member 50 at any location between the objective lens 30 and the collimating lens 63. The same effect can be obtained even when the position of the optical member 50 is exchanged with the position of the quarter wave plate 66.

Figure 7:
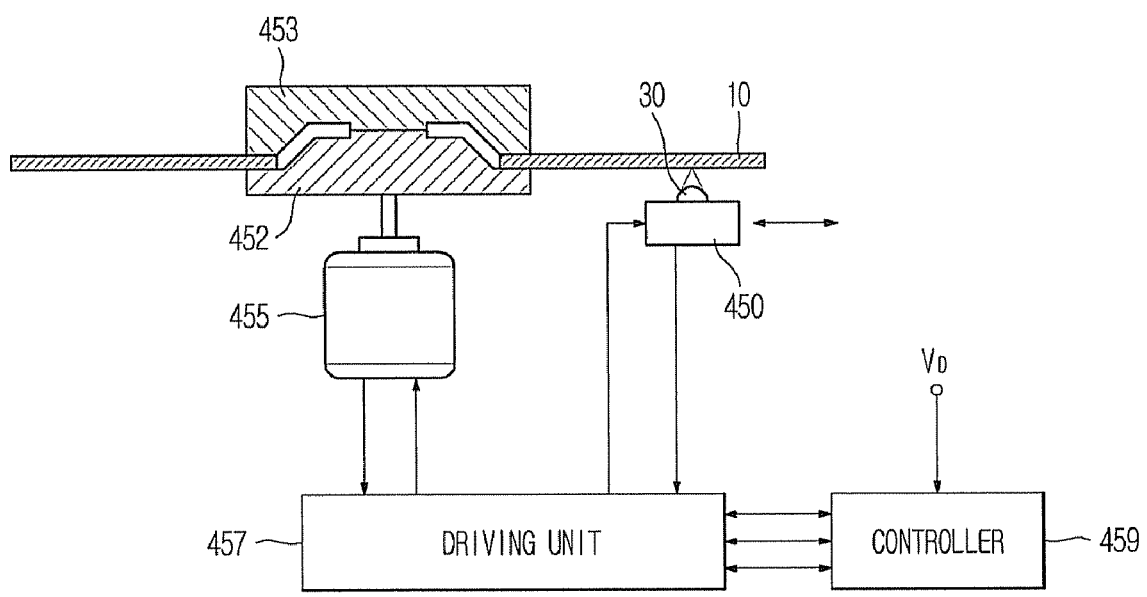
FIG. 7 is a schematic view illustrating a disc apparatus having the optical pick-up according to another embodiment of the present invention.

FIG. 7 shows a disc apparatus having the optical pick-up 450 according to another embodiment of the present invention. The disc apparatus includes a spindle motor 455, the optical pick-up 450, a driving unit 457, and a controller 459. The spindle motor 455 rotates the optical disc 10. The optical pick-up 450 is movably installed in the radial direction of the optical direction 10 and performs the reproduction and/or the recording of information on the optical disc 10. The driving unit 457 drives the spindle motor 455 and the optical pick-up 450. The controller 459 controls the focusing and the tracking servo of the optical pick-up 450. A clamp 453 holds the optical disc 10 in place. The optical pick-up 450 includes the architecture of the optical pick-up as shown in FIGS. 2 and 3.

The light reflected by the optical disc 10 is detected by the photodetector 40 provided in the optical pick-up 450 and is converted into an electric signal by photo-electric conversion such that the electric signal is inputted to the controller 459 through the driving unit 457. The driving unit 457 controls the RPM of the spindle motor 455, amplifies the inputted signal, and drives the optical pick-up 450. The controller 459 transmits a focus servo and a tracking servo, adjusted based on the signal inputted from the driving unit 457, to the driving unit 457 again such that the focusing and the tracking of the optical pick-up 450 are realized.

When the optical disc 10 having a plurality of signal recording layers L0 and L1 is recorded and/or reproduced, the optical transmission of a collimated original signal is maintained, and only the optical transmission of the noise light caused by the adjacent layers is decreased, such that the signal light enters the photodetector 40 as is. Thus, it is possible to easily prevent the detected tracking error signal from deteriorating.

As described above, according to the optical pick-up 450 of the present invention and the disc apparatus having the same, the optical transmission of the light reflected by the adjacent layer decreases when recording and/or reproducing the multilayer optical disc so that the deterioration of the tracking error signal caused by the adjacent layer can be effectively prevented. The optical member having an optical transmission varied according to an incident angle of light is installed between the object lens and the collimating lens to decrease the intensity of the noise light reflected by the adjacent layers in comparison to the intensity of the signal light, so that the interlayer signal coherence of the multilayer optical disc is eliminated and the deterioration of the RF signal characteristic can be effectively improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pick-up comprising:
   a light source to emit light with a predetermined wavelength;
   a light collecting unit to collect the light emitted from the light source to form a light spot on a signal recording layer of an optical disc having a plurality of recording layers;
   a photodetector to receive the light reflected by the optical disc so as to detect a signal; and
   an optical member to change the optical transmission of the light reflected by the optical disc according to an incident angle of the reflected light so as to decrease a transmittance of the optical member with respect to a noise light entering the photodetector,
   wherein the optical member comprises a liquid crystalline layer to transmit a majority of parallel signal light reflected by the optical disc and having the liquid crystalline layer perpendicular thereto and to absorb non-parallel incident noise light to be converged or diverged, to change the optical transmission of the light according to an incident angle of the light.

2. The optical pick-up according to claim 1, wherein the light source comprises an optical outputting unit to emit a light with a blue ray wavelength satisfying the Blu-ray optical disc standard.

3. The optical pick-up according to claim 1, wherein the light collecting unit comprises an objective lens having a numeric aperture of about 0.85 according to the Blu-ray optical disc standard.

4. The optical pick-up according to claim 1, further comprising an optical path converter to guide the light emitted from the light source so as to direct the light collecting unit and to guide the light reflected by the optical disc to direct the photodetector;
    wherein the optical member is positioned between the optical path converter and the light collecting unit.

5. The optical pick-up according to claim 4, wherein:
    the optical path converter comprises a collimating lens to collimate the light emitted from the light source; and
    the optical member is positioned between the collimating lens and the light collecting unit.

6. The optical pick-up according to claim 1, wherein the liquid crystalline layer is made of liquid crystalline polymers.

7. The optical pick-up according to claim 1, wherein the liquid crystalline layer has a thickness between 0.2 micrometers and 100 micrometers.

8. The optical pick-up according to claim 1, wherein the intensity of the noise light comprises the intensity of light reflected by an adjacent layer other than the signal recording layer.

9. The optical pick-up according to claim 8, further comprising:
    a grating to divide the light emitted from the light source into a 0th order light and ± first order lights to be projected on the optical disc;
    wherein the photodetector comprises a main photodetector to receive the 0th order light reflected by the optical disc and first and second sub-photodetectors to respectively receive the ± first order lights reflected by the optical disc, and the optical member decreases the intensity of the 0th order light reflected by the adjacent layers so as to decrease the intensity of the 0th order light reflected by the adjacent layers entering the first and second sub-photodetectors.

10. The optical pick-up according to claim 9, wherein the optical member decreases the intensity of the 0th order light reflected by the adjacent layers such that the intensities of the 0th order light reflected by the adjacent layers is less than that of the signal light of the signal recording layer.

11. The optical pick-up according to claim 10, wherein the signal recording layer comprises a layer having data to be recorded and/or reproduced.

12. A disc apparatus comprising:
    an optical pick-up to record and/or reproduce information on and/or from an optical disc having a plurality of recording layers;
    a driving unit to drive the optical pick-up; and
    a controller to control a focus servo and a tracking servo of the optical pick-up;
    wherein the optical pick-up comprises an optical member to decrease the intensity of a light reflected by an adjacent layer other than a signal recording layer of the recording layers of the optical disc, by changing the optical transmittance of the optical medium with respect to the light reflected by the optical disc according to an incident angle of the reflected light, and
    wherein the optical member comprises a liquid crystalline layer to transmit a greater amount of parallel signal light reflected by the optical disc than is blocked and having the liquid crystalline layer perpendicular to the signal light and to absorb non-parallel incident noise light to be converged or diverged, to change the optical transmission of the light according to an incident angle of the light.

13. The disc apparatus according to claim 12, wherein the optical disc comprises a multilayer optical disc including at least one side having a plurality of signal recording layers according to the Blu-ray optical disc standard.

14. The disc apparatus according to claim 12, wherein the optical member decreases the optical transmission of the light reflected by the adjacent layer such that the intensity of the light reflected by the adjacent layer is weaker than the intensity of a signal light of the signal recording layers.

15. The disc apparatus according to claim 12, wherein the liquid crystalline layer is made of liquid crystalline polymers.

16. The disc apparatus according to claim 15, wherein the liquid crystalline layer has a thickness between 0.2 micrometers and 100 micrometers.

17. An optical pick-up comprising:
    a light collecting unit to collect light emitted from a light source so as to form a light spot on a signal recording layer of an optical disc having a plurality of recording layers;
    a photodetector to receive light reflected by the optical disc so as to detect a signal corresponding to data recorded on the signal recording layer; and
    an optical member to change an intensity of the light reflected by the optical disc and passing through the optical member so as to decrease the intensity of noise light entering the photodetector,
    wherein the optical member comprises a liquid crystalline layer to transmit a majority of parallel light entering the optical member at a perpendicular angle and to absorb light entering the optical member at a substantially non-perpendicular angle.

18. The optical pick-up of claim 17, wherein the optical member further comprises:
    a plurality of electrodes to supply a voltage to the liquid crystalline layer; and
    a power supply to supply the voltage to the plurality of electrodes.

19. The optical pick-up of claim 17, wherein the optical member has a light transmittance of the signal light of 98%.

20. The optical pick-up of claim 17, wherein the optical member has a light transmittance of the noise light of less than 10%.

21. A recording and/or reproducing apparatus comprising:
    an optical pick-up to record and/or reproduce data stored on an optical disc via a light reflected from the optical disc;
    a driving unit to drive the optical pick-up; and
    a controller to control the driving unit and the optical pick-up so as to record and/or reproduce the data;
    wherein the optical pick-up comprises an optical member to change an intensity of the light reflected by the optical disc and passing through the optical member so as to decrease the intensity of noise light reflected by the optical disc, and
    wherein the optical member comprises a liquid crystalline layer to transmit a greater amount of parallel light entering the optical member at a perpendicular angle thereto than is blocked and to absorb light entering the optical member at a substantially non-perpendicular angle.

22. The optical pick-up of claim 21, wherein the optical member further comprises:

a plurality of transparent substrates arranged to face each other;

a plurality of transparent electrodes installed in the transparent substrates to receive voltages; and a liquid crystalline layer formed between the transparent electrodes to transmit light at different refractive indexes according to a polarized direction of incident lights when voltages are supplied.

* * * * *